United States Patent
Gupta et al.

(10) Patent No.: US 10,958,071 B2
(45) Date of Patent: Mar. 23, 2021

(54) ADAPTIVE ACTIVE POWER CONTROL IN RENEWABLE ENERGY POWER PLANTS

(71) Applicant: VESTAS WIND SYSTEMS A/S, Aarhus N (DK)

(72) Inventors: Manoj Gupta, Singapore (SG); Ravi Kumar, Melbourne (AU); Janakiraman Sivasankaran, Singapore (SG); Thomas Schmidt Grau, Singapore (SG); Martin Ansbjerg Kjær, Harlev J (DK); Kouroush Nayebi, Ikast (DK); John Godsk Nielsen, Hornslet (DK); Jesper Sandberg Thomsen, Hadsten (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 16/956,923

(22) PCT Filed: Nov. 20, 2018

(86) PCT No.: PCT/DK2018/050301
§ 371 (c)(1),
(2) Date: Jun. 22, 2020

(87) PCT Pub. No.: WO2019/120397
PCT Pub. Date: Jun. 27, 2019

(65) Prior Publication Data
US 2021/0006068 A1    Jan. 7, 2021

(30) Foreign Application Priority Data
Dec. 20, 2017 (DK) .......................... PA 2017 70968

(51) Int. Cl.
*H02J 3/00* (2006.01)
*H02J 3/38* (2006.01)
(Continued)

(52) U.S. Cl.
CPC ................ *H02J 3/001* (2020.01); *H02J 3/12* (2013.01); *H02J 3/24* (2013.01); *H02J 3/381* (2013.01);
(Continued)

(58) Field of Classification Search
CPC ...... H02J 3/001; H02J 3/24; H02J 3/12; H02J 3/381; H02J 2310/18; H02J 2300/28
See application file for complete search history.

(56) References Cited

U.S. PATENT DOCUMENTS

| 8,664,788 | B1 * | 3/2014 | Wagoner | ............... F03D 7/0244 290/44 |
| 2014/0152010 | A1 | 6/2014 | Larsen et al. | |
| 2017/0331295 | A1 * | 11/2017 | Abeyasekera | .......... H02J 3/381 |

FOREIGN PATENT DOCUMENTS

| EP | 2688172 A2 | 1/2014 |
| EP | 2738904 A2 | 6/2014 |

(Continued)

OTHER PUBLICATIONS

PCT Notification of Transmittal of the International Search Report and the Written Opinion of the International Searching Authority, or the Declaration, Application: PCT/DK2018/050301, dated Jan. 31, 2019.

(Continued)

*Primary Examiner* — Daniel J Cavallari
(74) *Attorney, Agent, or Firm* — Patterson + Sheridan, LLP

(57) ABSTRACT

A method for operating a renewable energy power plant comprising a plurality of renewable energy generators. The method comprises: identifying a predetermined condition of the renewable energy power plant, of the grid, or of the connection between the renewable energy power plant and the grid, the predetermined condition indicating a weak grid interconnection between the renewable energy power plant (Continued)

and the grid; and controlling each renewable energy generator in an adaptive active power mode in response to recovery of the grid from a voltage deviation. The adaptive active power mode comprises: determining a thermal capacity of a chopper resistor of the renewable energy generator; calculating, based upon the determined thermal capacity, a limit level of rate of change of active power output that may be implemented by the renewable energy generator; and operating the renewable energy generator to output active power at the calculated rate of change limit level.

16 Claims, 7 Drawing Sheets

(51) Int. Cl.
*H02J 3/24* (2006.01)
*H02J 3/12* (2006.01)

(52) U.S. Cl.
CPC ....... *H02J 2300/28* (2020.01); *H02J 2310/18* (2020.01)

(56) References Cited

FOREIGN PATENT DOCUMENTS

| WO | 2011050807 A2 | 5/2011 |
| WO | 2012134458 A1 | 10/2012 |
| WO | 2016062316 A1 | 4/2016 |
| WO | 2019120397 A1 | 6/2019 |

OTHER PUBLICATIONS

PCT Written Opinion of the International Searching Authority, Application: PCT/DK2018/050301, dated Jan. 31, 2019.
Danish Patent and Trademark Office, 1st Technical Examination of Patent Application: PA201770968, dated Jun. 26, 2018.

* cited by examiner

ADAPTIVE ACTIVE POWER CONTROL IN RENEWABLE ENERGY POWER PLANTS

TECHNICAL FIELD

The present disclosure relates to a control method for enhancing the performance of renewable energy power plants, and more particularly wind power plants, in weak grid environments.

BACKGROUND

It is important for renewable energy power plants, such as wind power plants, to provide reliable and high quality power. In particular, it is important to reduce oscillations and fluctuations in active power output, reactive power output, and/or voltage output from the power plant. This is because oscillations in any of these outputs may cause instability of power networks to which the power plant connects.

For example, the interconnection between a remote power plant and a power network may, under certain situations, be described as being a 'weak grid interconnection'. In other words, the power plant is connected to a power network that is considered to be a 'weak grid' at the point of interconnection. This means that small changes in reactive/active power exchange between the plant and the network may result in large voltage oscillations. Weak grids are typically identified by measuring a short-circuit ratio of the grid, and comparing it to a threshold value, usually three, where a weak grid has a short-circuit ratio of less than 3. The problems posed by weak grid interconnections and conventional solutions to reduce unwanted oscillations caused by them are discussed in patent application nos. WO 2016/062316 and EP 2463979.

A particular challenge faced where weak grid interconnections exist is fault recovery. After a fault has occurred on the power network, where the voltage level of the network deviated from normal operational levels, network operators expect the power plant to support the recovery of voltage back to its pre-fault levels by supplying sustained active power. However, during a fault, active power falls, and so must be ramped back up to pre-fault levels after the grid recovers from the fault, but, as noted above, small changes in active power exchange cause instability in weak grid interconnections.

WO 2016/062316 and EP 2463979 propose solving the problem of instability following grid fault recovery by slowly ramping the active power using predetermined ramp rates. However, while there is a need to ramp active power back to pre-fault levels as slowly as possible, using a predetermined ramp rate may not always be the best approach for certain situations.

Therefore, there exists a need for a solution that takes into account all factors concerning fault recovery in weak grid interconnected renewable energy power plants and thereby mitigates at least some of the above-mentioned problems.

SUMMARY OF THE INVENTION

According to an aspect of the present invention there is provided a method for operating a renewable energy power plant comprising a plurality of renewable energy generators. The method comprises identifying a predetermined condition of the renewable energy power plant, of the grid, or of the connection between the power plant and the grid. The predetermined condition indicates a weak grid interconnection between the power plant and the grid. The method also comprises controlling each renewable energy generator in an adaptive active power mode in response to recovery of the grid from a voltage deviation. The adaptive active power mode comprises: determining a thermal capacity of a chopper resistor of the renewable energy generator; calculating, based upon the determined thermal capacity, a limit level of rate of change of active power output that may be implemented by the renewable energy generator; and operating the renewable energy generator to output active power at the calculated rate of change limit level.

The operation of the plant and generators in the adaptive active power mode maintains stability of the grid in conditions where larger voltage oscillations may occur following a voltage deviation, but does so without forsaking the safe operation of the generators. Therefore, the method results in a beneficial compromise between the stability and the safety, and in particular, the safety of the generator based upon the thermal capacity of its chopper resistor, and ensures that the correct balance is found to satisfy requirements of the grid.

The method may comprise calculating a short-circuit ratio of the grid. The method may comprise identifying a predetermined condition at least in part by comparing the short-circuit ratio with a predetermined threshold value.

The method may comprise calculating a phase angle difference between two separate measurements of a parameter. The method may comprise identifying a predetermined condition at least in part by comparing the phase angle difference with a predetermined phase angle difference value.

The method may comprise monitoring a voltage level of the renewable power plant, grid, or connection. The method may comprise identifying a predetermined condition at least in part by comparing the voltage level or the rate of change of voltage against a predetermined threshold.

Calculating any of a short-circuit ratio, a phase angle difference, a voltage level, or a rate of change of voltage level by which the adaptive active power mode may be activated is a particularly useful, and efficient manner of identifying a weak grid interconnection. More specifically, setting a threshold or range of values over which these parameters may be monitored and analysed, the method can be tailored to the set-up of the power network or power plant and so can ensure safe, compliant operation of the generators.

The use of such values is also particularly beneficial in ensuring a swift and clear switch to the adaptive mode so that the recovery of voltage levels from the deviation can be supported by a slow change in active power output, thereby preserving stability of the voltage levels of the grid.

Identifying a predetermined condition may comprise receiving a control signal from an external protection system of the grid.

Advantageously, the adaptive active power mode may also be operated according to external protocol, which can be useful where a change in grid conditions may result in a weak grid interconnection. By permitting the external protection system to send a control signal to enter the adaptive mode, precaution against weak grids can be implemented quickly, especially where measurements may not be possible or reliable.

The method may comprise receiving a target active power output level towards which the output of the renewable power plant should be ramped. The limit level may also be calculated based upon the target active power output level.

The limit level may be calculated to be the lowest possible rate of change of active power output by the renewable energy generator to attain the target active power output level without exceeding the thermal capacity of the chopper resistor.

Where a weak grid interconnection exists, changes in active power level may cause voltage oscillations at the grid, and so operating a renewable energy power plant to change active power as slowly as possible is desirable. Therefore, specifying a limit level for rate of change of active power output by the generator is particularly useful in ensuring that the stability of the grid voltage levels is maintained.

In some embodiments, the limit level may comprise an upper and/or a lower bound.

The limit level may be continually or periodically recalculated during the change in active power output, and may be based upon a stability measurement of the grid.

The limit level may also be based on a short-circuit ratio, voltage level, rate of change of voltage level, phase difference, or a command from an external protection system.

Calculating the limit level may further comprise generating an injection profile for active power output of the renewable energy generator. The method may comprise operating the renewable energy generator to output active power according to the generated injection profile.

An injection profile may be generated based upon previous voltage deviations, and reduces the number of commands required to be sent to each renewable energy generator. Thus, the accuracy of the renewable energy generator's injection of active power may be increased.

The method may comprise terminating the adaptive active power mode once the output from the renewable power plant is equal to the active power output level.

The chopper resistor may form part of a chopper circuit. Determining the thermal capacity of the chopper resistor of the renewable energy generator may comprise modelling the operation of the chopper circuit. Determining the thermal capacity of the chopper resistor of the renewable energy generator may comprise calculating the thermal capacity of the chopper resistor based upon the model.

Determining the thermal capacity of the chopper resistor of the renewable energy generator may comprise monitoring at least one parameter of the renewable energy power plant, the grid, the connection between the renewable energy power plant and the grid, or of the renewable energy generator. Determining the thermal capacity of the chopper resistor of the renewable energy generator may comprise calculating the thermal capacity of the chopper resistor based upon the monitored parameter.

The at least one parameter may be the active power output of the renewable energy generator.

Each renewable energy generator may comprise at least a first and a second chopper resistor. The first chopper resistor may be for use during adaptive active power mode. The second chopper resistor may be for use at other times. Adaptive active power mode may be performed with respect to the first chopper resistor only.

An additional chopper resistor for use in the adaptive active power mode allows the active power output of the generator to be changed at a much slower rate than would be possible. Ramping the active power at a slower rate improves the stability of the grid voltage levels.]

According to another aspect of the invention, there is provided a controller configured to control a renewable energy power plant according to a method as described above.

The renewable energy power plant may be a wind power plant.

According to another aspect of the invention, there is provided a computer program downloadable from a communication network and/or stored on a machine readable medium, comprising program code instructions for implementing a method as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
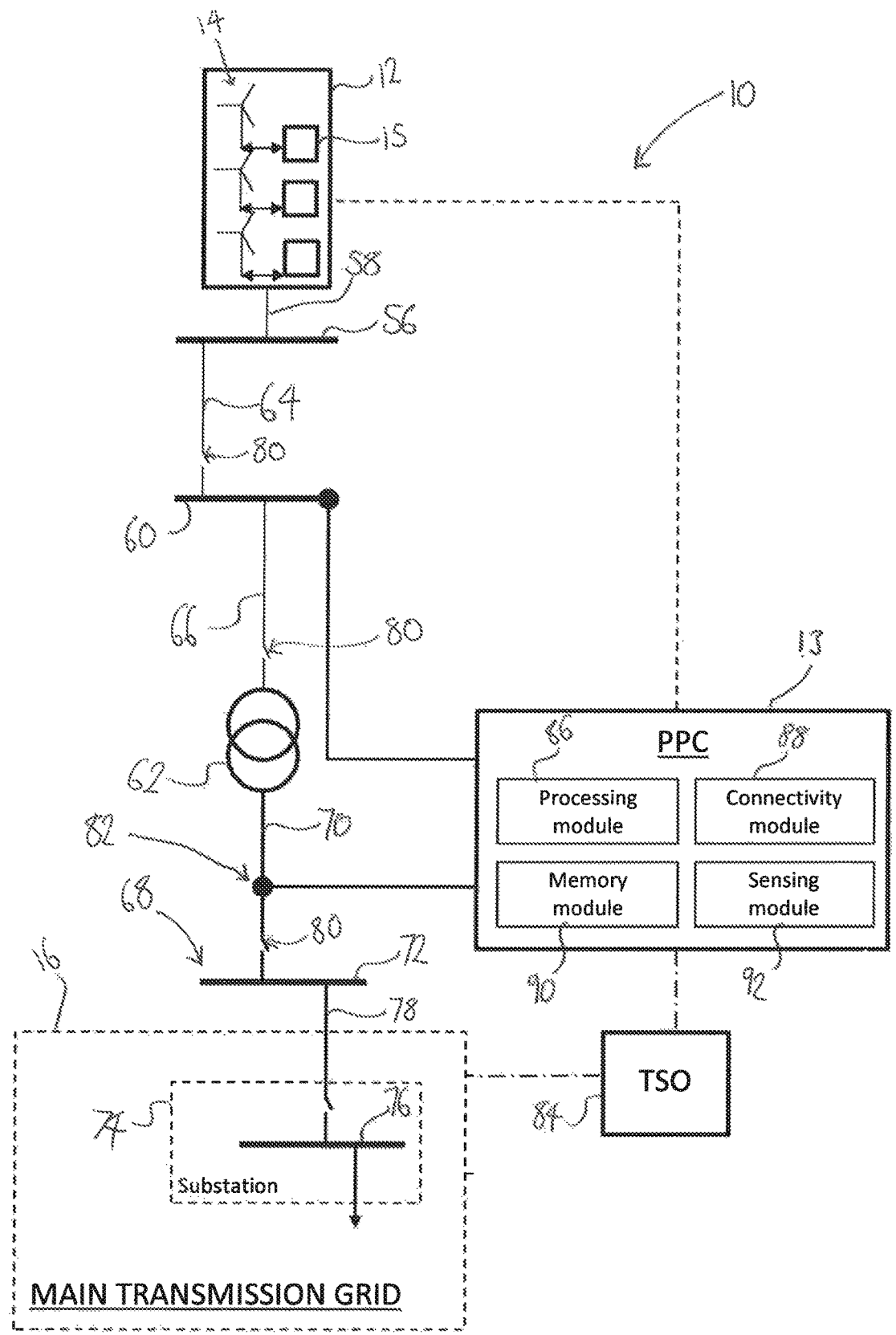
FIG. 1 is a schematic representation of a wind power plant, its connection to a grid, and its control system.
Figure 3:
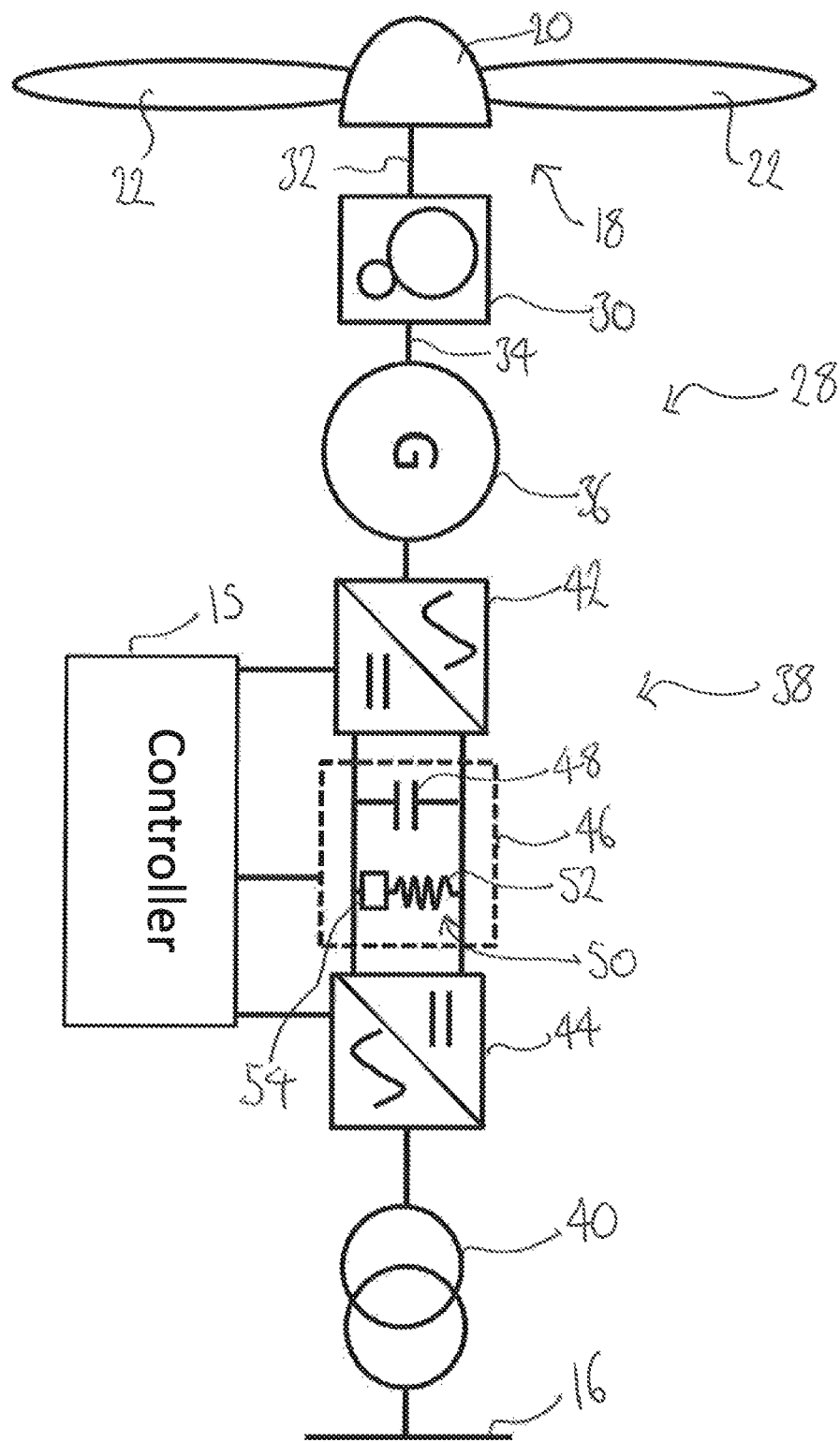
FIG. 3 is a schematic representation of the wind turbine generator in FIG. 2, within which embodiments of the invention may be incorporated.

FIG. 1 illustrates a typical architecture in which a wind power plant (WPP) is connected to a main transmission grid as part of a wider power network. FIG. 3 illustrates a typical architecture for a wind turbine generator (WTG), or more simply a 'wind turbine'. As will be understood by the skilled reader, a WPP comprises at least one WTG, and is also known as a wind park or a wind farm. The examples shown are representative only and the skilled reader will appreciate that other specific architectures are possible, in relation to both wind power plants, power plants for other renewable energy sources, wind turbine generators and other renewable energy generating sources. Thus, the invention also relates to renewable energy power plants and renewable energy generators in general, rather than being specific to wind power plants and generators as in the Figures. In addition, the skilled reader will appreciate that methods, systems and techniques also described below may be applicable to many different configurations of power network. Moreover, the components of the wind power plant and power network are conventional and as such would be familiar to the skilled reader. It is expected that other known components may be incorporated in addition to or as alternatives to the components shown and described in FIGS. 1 and 3. Such changes would be within the capabilities of the skilled person.

FIG. 1 shows a power network 10 incorporating a WPP 12. The WPP 12 includes a plurality of WTGs 14. Each of the plurality of WTGs 14 converts wind energy into electrical energy, which is transferred from the WTGs 14 to a main transmission network or main grid 16, as active current, for distribution.

Each of the WTGs 14 is associated with a respective WTG controller 15. In some embodiments, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current requests received from a power plant controller (PPC) 13. During extraordinary conditions, the WTG controllers 15 operate to fulfil predetermined network requirements, and also act to protect the WTGs 14 from any potentially harmful conditions.

Figure 2:
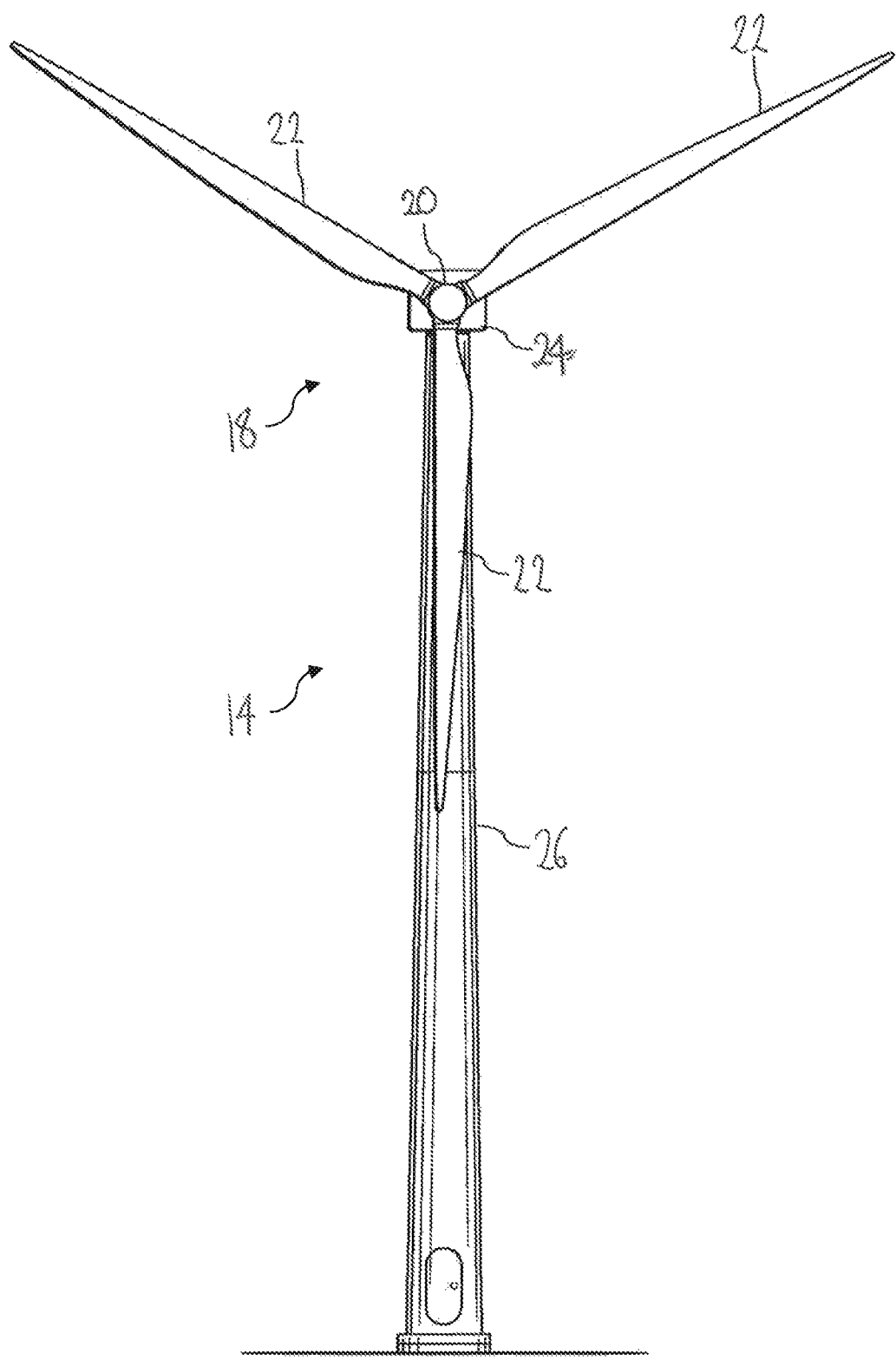
FIG. 2 is a front view of a wind turbine generator.

A typical WTG 14 is shown in FIG. 2, while a typical WTG architecture 28 with an associated controller 15 is shown in FIG. 3. The WTG 14 comprises a rotor 18 including a hub 20 to which three blades 22 are attached. The rotor 18 is rotatably supported by a nacelle 24 that is mounted to the top of a tower 26 in the usual way.

The nacelle 24 houses and supports various power generating components of the WTG 14, as will be described with reference to FIG. 3. As is known, a flow of wind acting on the blades 22 spins the rotor 18, which drives the power generation equipment housed in the nacelle 24.

The WTG 14 illustrated in FIG. 2 is an onshore WTG, although the invention may equally be applied to an offshore WTG. Here, the WTG 14 is a horizontal axis wind turbine (HAWT) having three blades, which is a common type of system, although other types having different numbers of blades exist to which the invention is also applicable.

FIG. 3 illustrates the system architecture 28 of the WTG 14 of FIG. 2. In the WTG 14 of FIG. 2, the rotor 18 drives a transmission 30 by way of an input drive shaft 32. Although the transmission 30 is shown here in the form of a gearbox, it is also known for WTGs to have direct-drive architectures which do not include a gearbox. The transmission 30 has an output shaft 34 which drives an electrical generator 36 for generating three-phase electrical power. In this way, the rotor 18 drives the electrical generator 36 through the transmission 30.

The generator 36 is connected to a power converter 38 by a suitable three-phase electrical connector such as a cable or bus. The power converter 38 converts the output frequency of the generator 36 to a frequency that is suitable for supplying to the main grid 16. The output of the power converter 38 is transmitted to the grid 16 through a transformer 40.

The power converter 38 includes a generator-side (or 'machine-side') AC-DC converter 42, and a line-side (or 'grid-side') DC-AC converter 44, which are coupled in series by a DC link 46, depicted in FIG. 3 by the dashed box. The DC link 46 comprises a smoothing capacitor 48 and a chopper circuit 50. The smoothing capacitor 48 operates to smooth the DC output, while the chopper circuit 50 acts as a dump load to enable excess energy to be discharged. The chopper circuit 50 incorporates a switched resistor, comprising a resistor 52, often called a 'chopper resistor', and a semiconductor switch 54. By operating the switch 54 to include the chopper resistor 52 in the circuit 50, the output of active power from the WTG 14 can be regulated, and limited as required. Semiconductor switching devices achieve regulation of the active power output by switching between 'on' and 'off' states at high frequency and at a particular duty cycle to produce an intended output. For example, using a duty cycle of 50% will result in output active power that is half of the output power from the generator-side converter being dissipated by the chopper resistor 52. Suitable switching devices for this purpose include integrated gate bipolar transistors (IGBTs) or metal-oxide-semiconductor field-effect transistors (MOSFETs). The operation of chopper resistors, also known as 'dump loads', would be well known to skilled persons within this technical area and so further discussion of such devices will not be included here for the sake of clarity. For example, chopper resistors are discussed in detail in 'Wind Turbines' by Erich Hau, published 2006. In particular Chapter 10.4 discusses their operation.

However, the dissipation of large amounts of excess energy by the chopper resistor 52 may cause increases in temperature that the chopper resistor 52 is unable to cope with, and so consideration of the capacity of the chopper resistor 52 is particularly important.

Figure 4:
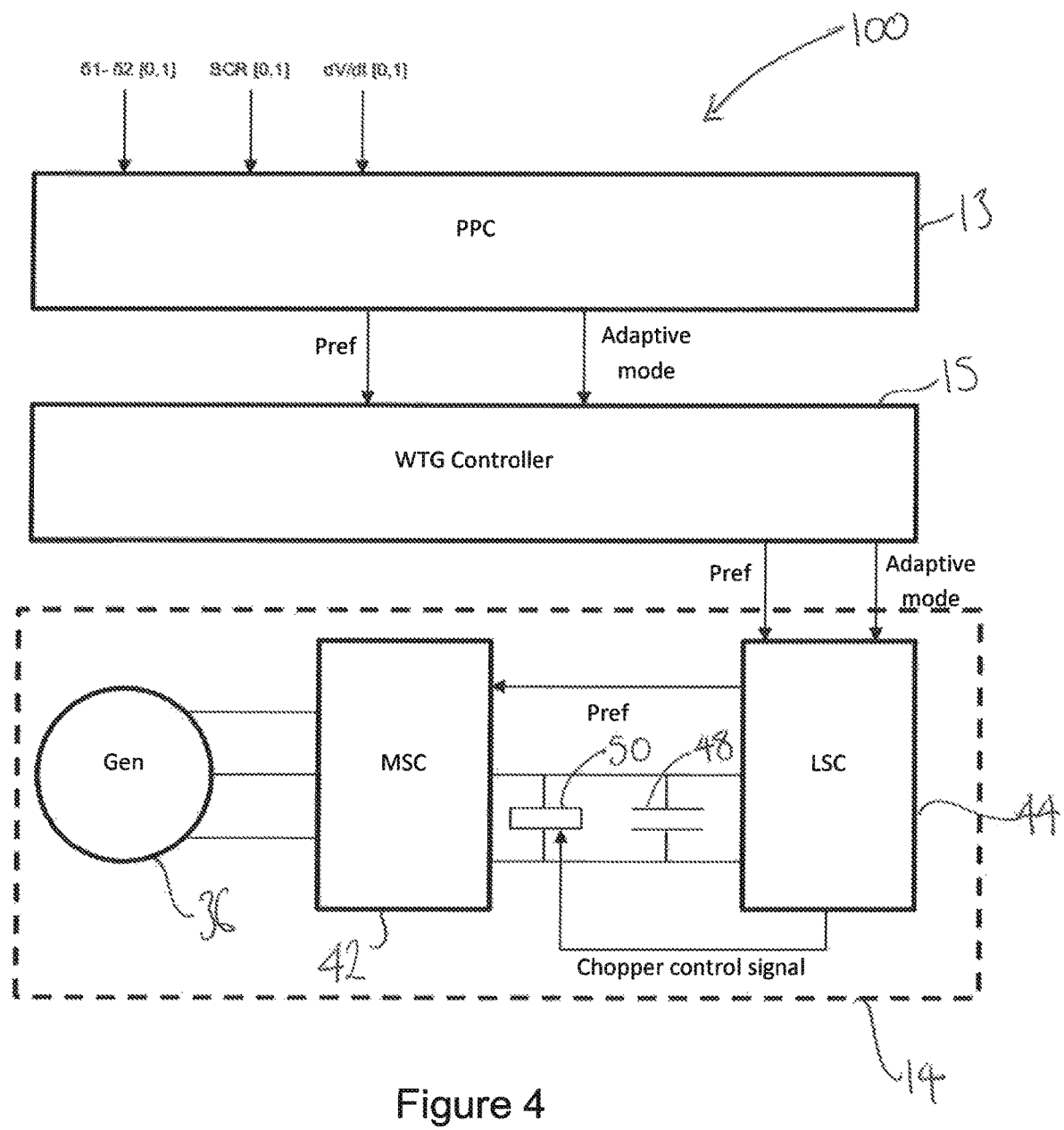
FIG. 4 is a schematic representation of the communication between modules of the wind power plant according to embodiments of the invention.
Figure 5:
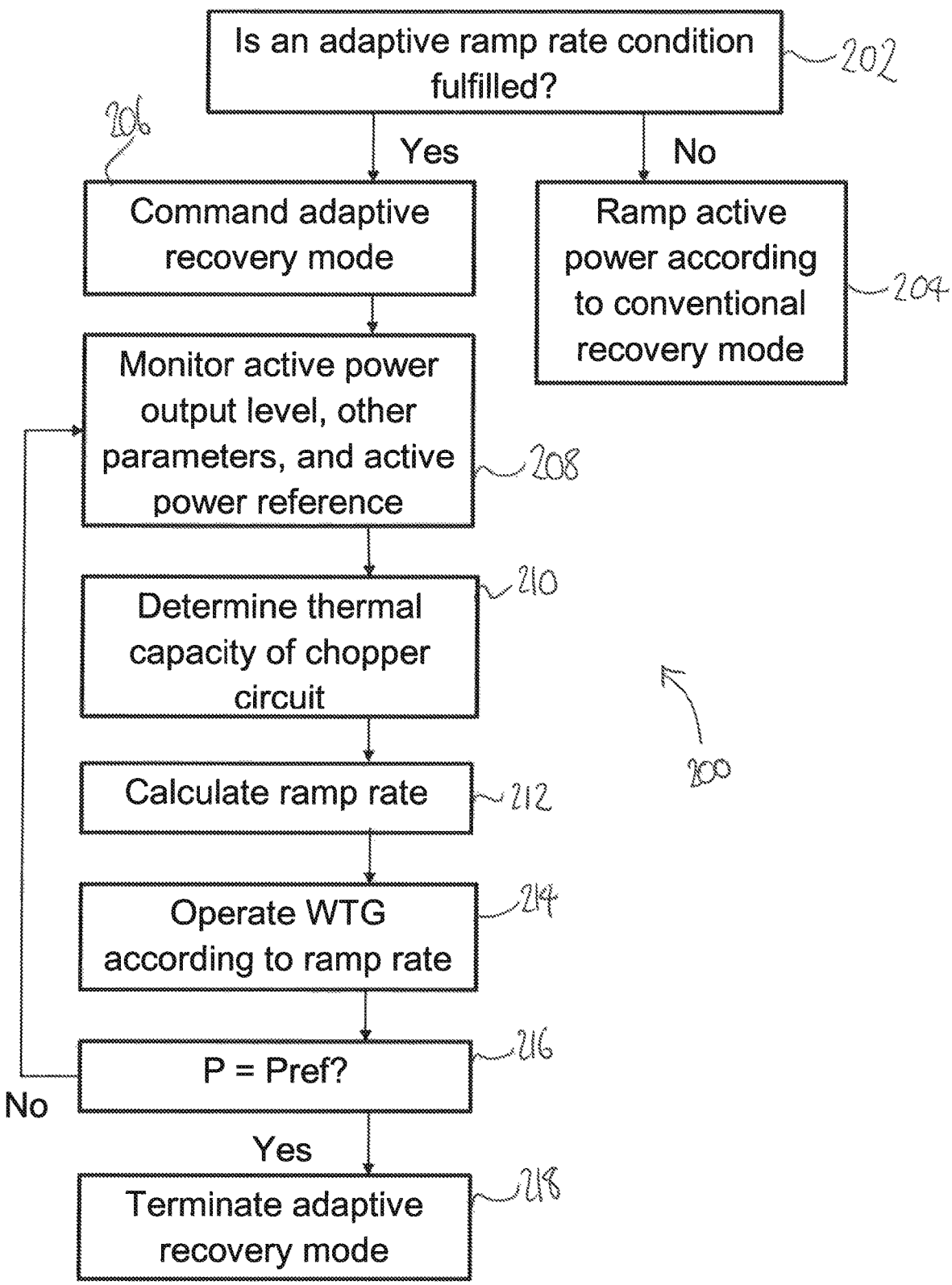
FIG. 5 is a flow chart governing the operation of a wind turbine generator during adaptive recovery mode.
Figure 6:
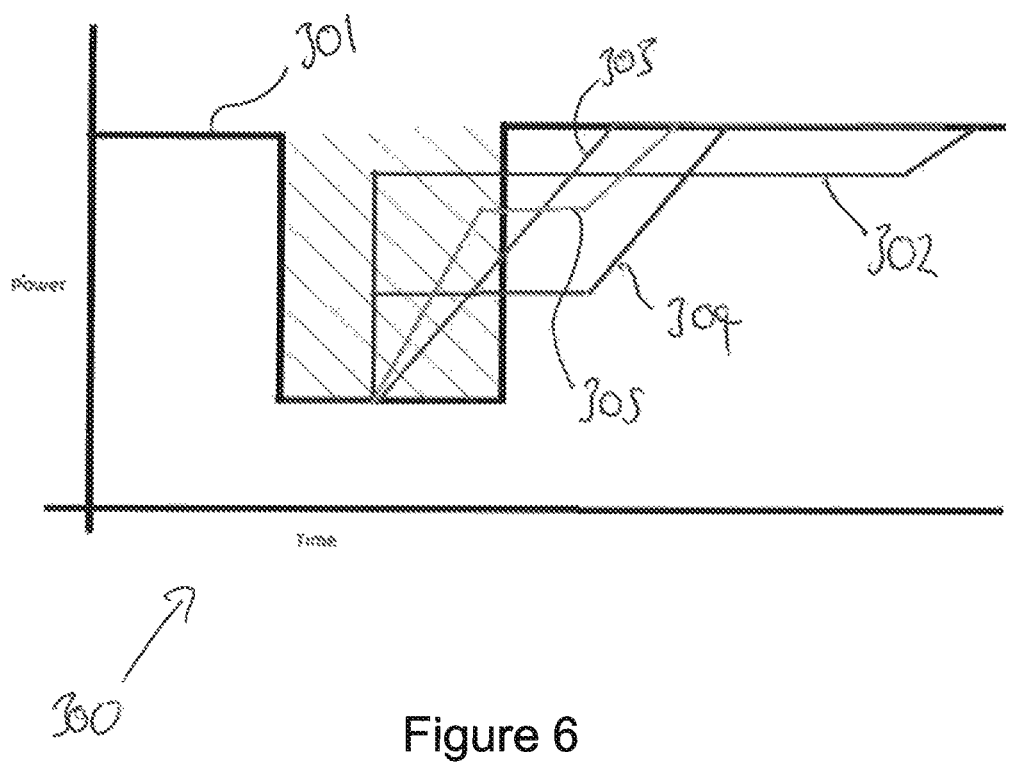
FIG. 6 is a chart illustrating conventional active power recovery, and active power recovery according to embodiments of the invention.

As discussed in relation to FIG. 1, the WTG 14 also comprises a WTG controller 15, which controls the operation of both the generator-side converter 42 and the grid-side converter 44 for efficient power conversion, and the chopper circuit 50 for regulation of active power production. The controller 15 of the WTG 14 receives signals from the PPC 13 to operate the WTG 14 according to an adaptive active power recovery mode. The adaptive active power recovery mode, which is described in more detail below in relation to embodiments of the invention shown in FIGS. 4 to 6, is implemented following recovery of grid voltage to normal operational levels after a deviation and aids recovery of active power to an operational level while ensuring that a compromise is met between continued stability of the grid 16 and protecting components within the WTG 14.

Now returning to FIG. 1, each of the WTGs 14 of the WPP 12 is connected to a local grid (not shown) that links the WTGS 14. The WPP 12 is, in turn, suitably connected to a collector bus 56 via a feeder line 58. The collector bus 56 may be at a voltage level that is suitable for relatively short distance power transmission, for example in the region of 10 kV to 150 kV, most usually between 110 kV and 150 kV. The collector bus 56 may also provide a point of common coupling (PCC) for a plurality of wind power plants, although, only a single WPP 12 is shown here for simplicity.

The collector bus 56 is connected to a medium voltage bus 60, which in turn is connected to a main step-up transformer 62. The collector bus 56, medium voltage bus 60 and main step-up transformer 62 are connected by transmission lines 64, 66. The main transformer 62 is in turn connected to the main grid 16 at a Point of Interconnection (Poi) 68 by another transmission line 70. The Poi 68 is an interface between the WPP 12 and the main grid 16 and comprises a PoI bus 72 whose nominal voltage level is higher than that of the collector and medium voltage buses 56, 60.

While the collector and medium voltage buses 56, 60 may be required to span distances up to around 100 km, the main grid 16 and PoI bus 72 may be an international, national, or regional grid such as the National Grid of Great Britain, for example, and therefore may be required to span distances of up to around 250 km or more. Accordingly, the voltage level of the main grid 16 and the Poi bus 72 may be much higher than the voltage level of the collector and the medium voltage buses 56, 60 for better transmission efficiency. As such, the main transmission grid 16 may comprise a plurality of substations and additional buses operating at different voltages as well as further transformers to increase the voltage for improved transfer of power. The transmission grid 16 shown in FIG. 1 includes at least one substation 74 and an associated feeder bus 76, connected to the PoI bus 72 by a transmission line 78.

The connecting lines such as the transmission and feeder lines 58, 64, 66, 70, 78 may each include a protection system 80 to protect individual components from damage during or following extreme conditions. For example, it is envisaged that at least an appropriate circuit breaker will be included in each line.

Hereinafter, it should be assumed that references to components being connected or connections between components comprise suitable feeder or transmission lines as described above unless it is otherwise indicated.

A Power Plant Controller (PPC) 13 is connected to the power network at a Point of Measurement (PoM) 82 and is also connected directly to the WPP 12. The role of the PPC 13 is to act as a command and control interface between the WPP 12 and the grid 16, and more specifically, between the WPP 12 and a grid operator or transmission system operator (TSO) 84. The PPC 13 is a suitable computer system for carrying out the controls and commands as described above and so incorporates a processing module 86, a connectivity module 88, a memory module 90 and a sensing module 92. The PPC 13 may also receive information regarding the grid 16 and/or the local buses, substations and networks from an energy management system (not shown).

The PPC 13 is connected to the transmission line 70 between the main transformer 62 and the PoI bus 72 at the PoM 82 to allow monitoring and regulation of the output of the WPP 12 and to interpret the power demands correctly. The PPC 13 is also connected to the medium voltage bus 60 to measure a variety of parameters that are representative of the state of the grid 16 and WPP 12, and that can be used to improve the outputs of the WPP 12 to best meet the requirements of the TSO 84 or as set out in a set of grid-specific requirements.

The PPC 13 is equipped to measure a variety of parameters including a representative power output that will be supplied to the main grid at the PoI 68 by the WPP 12. As the PoM 82 is not at the PoI 68, the measured parameters are only representative as losses in the lines between the PoM 82 and PoI 68, and between the PoM 82 and the PPC 13, may have an effect on the measurements. Suitable compensation may take place to account for the losses to ensure that the measurements are accurate.

The PPC 13 measures parameters of the power output such as reactive and active power exchange between the WPP 12 and the main grid 16, and the voltage level of the main grid 16. The PPC 13 compares the measured parameters against specific grid requirements and, in a suitable manner, communicates control commands to specific components of the WPP 12 accordingly. The WPP 12 is capable of altering its power or voltage output in reaction to commands received from the PPC 13. It will be noted that FIG. 1 is a schematic view, so the way in which the control commands are transferred is not depicted explicitly. However, it will be appreciated that suitable cabling may be provided to interconnect the PPC 13 and the WTGs 14 or WTG controllers 15. The interconnections may be direct or 'point to point' connections, or may be part of a local area network (LAN) operated under a suitable protocol (CANbus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

As discussed above, the PPC 13 manages the WPP 12 according to a set of grid requirements that are specific to the main grid 16. Specific circumstances require different modes of operation. In particular, the operation of the PPC 13 and WPP 12 in reaction to a grid fault is especially important and requires careful control of voltage and power outputs to support the grid 16, and enable an efficient and safe recovery to normal operating levels.

As will be understood by the skilled person, a grid fault, also known as a voltage deviation or excursion, is generally defined as a period in which the voltage level of the grid 16 or wider power network drops to a level outside the accepted and normal operational bounds. During a grid fault, the PPC 13 operates the WPP 12 in a low-voltage ride through (LVRT) mode to avoid disconnection of the WPP 12 from the grid and to support the grid 16 through the fault. In the LVRT mode, the PPC 13 and WPP 12 support the grid 16 during the fault by supplying reactive power to encourage a rise in voltage levels. The WPP 12 is required to supply reactive power until the voltage levels have returned to levels that are within a normal operating band. In many circumstances, this operating band is between voltage levels of 0.9 per-unit (pu) voltage to 1.1 pu voltage.

Per-unit voltage is an expression of the voltage with respect to a base value which is used as a reference. Using a per-unit system allows for normalization of values across transformers and other components that may change the value by an order of magnitude.

WPPs 12 supporting the grid during a grid fault by operating in LVRT mode are also typically required to supply active power at a level that is proportional to voltage level in that LVRT mode. As voltage has dropped during a fault, the WPP 12 is operated to reduce active power output accordingly. This is enabled by the chopper circuit 50, which permits the almost immediate 'dumping' of active power as heat energy through the resistor 52. The amount of active power dissipated in the chopper circuit 50 can be controlled by changing the duty cycle of the switch 54.

Thus, during a grid fault, active power levels are dropped to a lower level than their operational, pre-fault levels. Once the voltage level has recovered to within its normal operational bounds (0.9 pu voltage to 1.1 pu voltage), the WPP 12, and therefore each WTG 14, is required to 'recover' its active power and reactive power levels back to operable levels by increasing or decreasing their output of each of active and reactive power as required. In the embodiments discussed in detail below, it is assumed that the operable level to which active power levels return following the fault is the pre-fault level. It will be appreciated that the invention described herein may also be implemented where the operable active power level differs from pre-fault levels following the fault.

Ordinarily, a main grid such as the main grid 16 shown in FIG. 1 operates well within its design limits, and so normal operating conditions of the grid 16 are re-attained following a fault when operating of the WPP 12 according to conventional voltage control methods. The recovery of the grid 16 using voltage control methods is a stable recovery if the grid 16 is operating within its design limits, and the active power level can be returned to operable levels quickly by reducing the duty cycle of the switch 54.

However, where the grid 16 is operating close to or at its design limit, the grid 16 has a low fault level and a weak grid interconnection exists or may occur following a fault. In these circumstances, the supply of voltage and power at the PoI bus 72 is volatile and small exchanges in reactive or active power at the PoI bus 72 may result in large fluctuations of grid voltage. Weak grid interconnections occur most often in remotely located facilities where insufficient infrastructure is provided, resulting in a high likelihood that the design limit will be reached.

Where a weak grid interconnection exists following a fault, changes in the generation capabilities of the grid 16 and the volatility introduced by the weak grid interconnection mean that the recovery must be carefully managed. In particular, the return of active and reactive power to operable levels may provide potentially harmful oscillations in the voltage level of the grid 16 if the rate of change of power level is too high.

Operating the WPP 12 in voltage control mode as would ordinarily be possible with stable grid interconnections would result in a step change or a very fast ramp in active power following recovery of voltage levels following the fault, and, as a weak grid interconnection exists, large oscillations in voltage level of the grid 16 which are likely to trigger fault protection systems in the WPP 12.

Therefore, it is desirable to operate the WPP 12 to output active power so that the ramp from the fault active power level to the post-fault active power level is much slower than the rate of increase under voltage control mode. However, slowly increasing the active power level requires increased energy to be dissipated by the chopper circuit 50, and therefore an increased heating effect in the chopper resistor 52.

As such, a trade-off is required between the requirement to implement a slow ramp rate to preserve stability of grid voltage levels where a weak grid interconnection exists and the thermal capacity of the chopper resistor 52 to implement the slow ramp of active power levels.

FIG. 4 illustrates a schematic representation 100 of information flow between the PPC 13, the WTG controller 15, and the WTG 14 when operating in an adaptive active power recovery mode according to an embodiment of the invention. The adaptive active power recovery mode operates individual WTGs 14 to ramp active power levels back to their operable, i.e. pre-fault, levels using a variable rate of change of active power. Rate of change of active power may also be referred to below as active power ramp rate.

As shown in FIG. 4, the PPC 13 initially receives inputs relating to a plurality of so-called 'trigger conditions'. These conditions identify the state of the grid interconnection, and the presence or fulfilment of one of the conditions results in the PPC 13 commanding WTG controllers to operate the WTGs 14 to recover in adaptive active power recovery mode if a grid fault occurs, and will be discussed in more detail later. Example trigger conditions shown in FIG. 4 are phase angle difference ($\delta_1-\delta_2$), short-circuit ratio (SCR), and change in voltage level (dV/dt).

Upon determining that a trigger condition is fulfilled, either by receiving an input relating to that trigger condition, by calculation within the PPC 13 or by other means, the PPC 13 communicates to each individual WTG controller 15 to operate the WTG 14 according to the adaptive active power recovery mode following any subsequent grid fault. Similarly, if it is determined that the trigger condition is no longer fulfilled, then the PPC 13 may also communicate to its WTG controllers 15 that adaptive active power recovery mode is no longer required, although this is not shown in FIG. 4.

In addition to the command to operate in adaptive recovery mode, the WTG controllers 15 also receive an active power reference, Pref, value from the PPC 13. The Pref value relates to the operable post-fault level towards which the active power should be ramped following the fault. As discussed above, this may be the same as pre-fault levels or different, depending upon the control method employed.

Each WTG controller 15, upon receiving instructions to enter adaptive power mode and the Pref value from the PPC 13, generates an input signal for controlling the WTG 14. The input signal comprises an active power set point command for implementation by the generator-side converter and a switching command for implementation at the chopper circuit 50. The generator-side converter 42 is therefore operated to output active power according to the Pref value, while the chopper circuit 50 is switched according to the received command to dissipate active power.

Using feedback signals from the chopper circuit 50, or by modelling the chopper circuit's capacity, the WTG controller 15 can adaptively alter its command signals to the WTG 14 and thereby implement slow increases in active power as required. This may be implemented using small step changes for a given period of time to implement a smooth increase over a longer period of time.

It should be noted that the WTG controller 15 also implements a limiter for maximum and minimum achievable ramp rates, and implements limits according to the mechanical potential of the WTG 14 to implement the specified ramp rate. If the generated ramp rate from the WTG controller 15 is found to be below the minimum ramp rate, or above the maximum ramp rate, then the ramp rate is set as the minimum or maximum respectively.

Depending upon the state of the chopper circuit 50, it may also be possible to clamp the active power output level at a fixed, intermediate value for a few seconds before continuing the increase. This would help to further damp any voltage oscillations that have already developed because of the increasing active power level.

By generating and controlling according to a frequently updated ramp rate, the WTG controller 15 can ensure that the maximum potential is extracted from the chopper circuit 50 and the slowest achievable active power ramp rate is implemented. If the chopper circuit 50 comes close to overheating, the system can act to increase the active power ramp rate and reduce the load on the chopper circuit 50.

The adaptive mode activation and implementation discussed above in relation to FIG. 4 is shown as a control method in the form of a flow chart 200 in FIG. 5. As can be seen in FIG. 5, the adaptive mode is activated following monitoring 202 of an adaptive mode trigger condition. If the trigger condition is not fulfilled, then the ramping of active power from fault levels to post-fault levels is performed 204 according to a conventional voltage control recovery mode.

If the trigger condition is fulfilled, then commands are issued 206 to operate according to an adaptive recovery mode. In the adaptive recovery mode, a plurality of parameters are monitored 208, such as the active power output level from the WTG 14, the active power reference, Pref, value generated by the PPC 13 and other necessary parameters, such as those fed back to the system by the chopper circuit 50, if applicable, or the model of the chopper circuit 50 in some embodiments.

Using these inputs, the thermal capacity of the chopper circuit 50 is determined 210, and therefore the maximum amount of energy that can be dissipated using the chopper circuit 50. A 'ramp rate', also rate of change of active power level, is then calculated 212 using the determined thermal capacity and other parameters. Thus, the ramp rate can be considered to be a function of the energy capacity remaining in the chopper circuit 50.

It will be appreciated that the thermal capacity of the chopper resistor 52 may be determined in a number of ways, taking into account any relevant earlier operation of the chopper resistor 52 and any planned or required future operation. For example, the thermal capacity may be modelled using an internal, pre-programmed model or look-up table, or may be calculated based upon a plurality of measured parameters. The thermal capacity may even be implemented using a handshake protocol, whereby a specific controller is implemented within the chopper circuit 50 to provide calculated thermal capacities to the WTG controller 15 for use in its determination of ramp rate.

Having determined 212 a ramp rate, including any further inputs as required, such as whether the upper and lower mechanical limits apply, the appropriate commands are issued to the WTG, and the WTG is operated 214 according to the calculated ramp rate.

A check 216 is performed, to identify if the active power output level is equal to the reference level. This could be in the form of checking the output of the WTG 14, by either the WTG controller 15 or the PPC 13, or determining the activity of the switch 54 in the chopper circuit 50 or querying a recent command issued to the switch 54.

If the active power level is not equal to the reference value then the adaptive recovery mode steps 208, 210, 212, 214, 216, 218 is repeated. If the active power level has achieved the reference value, then the adaptive recovery mode is terminated 218.

FIG. 6 shows a chart illustrating conventional active power output line 301 for voltage control mode contrasted with a plurality of potential outputs 302, 303, 304, 305 according to the adaptive recovery mode, each of which dissipate the same amount of energy through the chopper circuit 50. The conventional output 301 includes step changes from a first, pre-fault level to a second, fault level, and back to the first level sometime after, once the fault has finished. The amount of energy dissipated by the chopper circuit 50 in this case is the product of the power difference and time.

In contrast, the alternative responses 302-305 that are shown and are achievable using the adaptive recovery mode of the invention show the same step change from the pre-fault level to the fault level, but then vary, showing a variety of ramp rates, and smaller step changes. As shown, each of the recoveries begins sooner than in the conventional output and achieve the first level later than previously.

Figure 7A:
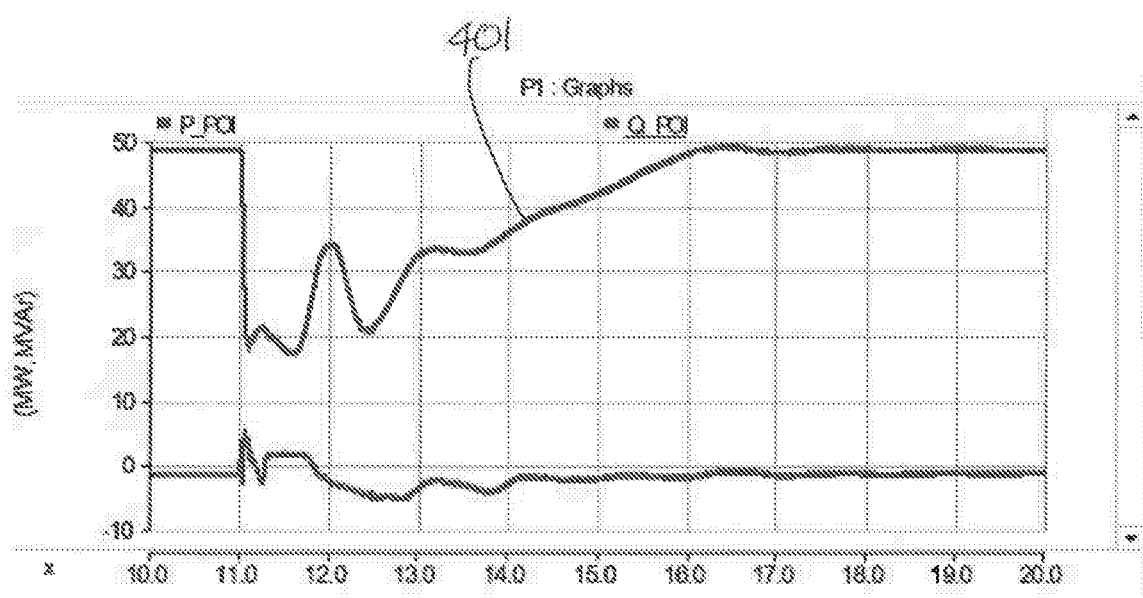
FIG. 7a is a chart illustrating active power recovery resulting from a generator operated in adaptive active power recovery mode in response to the voltage deviation of FIG. 7b.
Figure 7B:
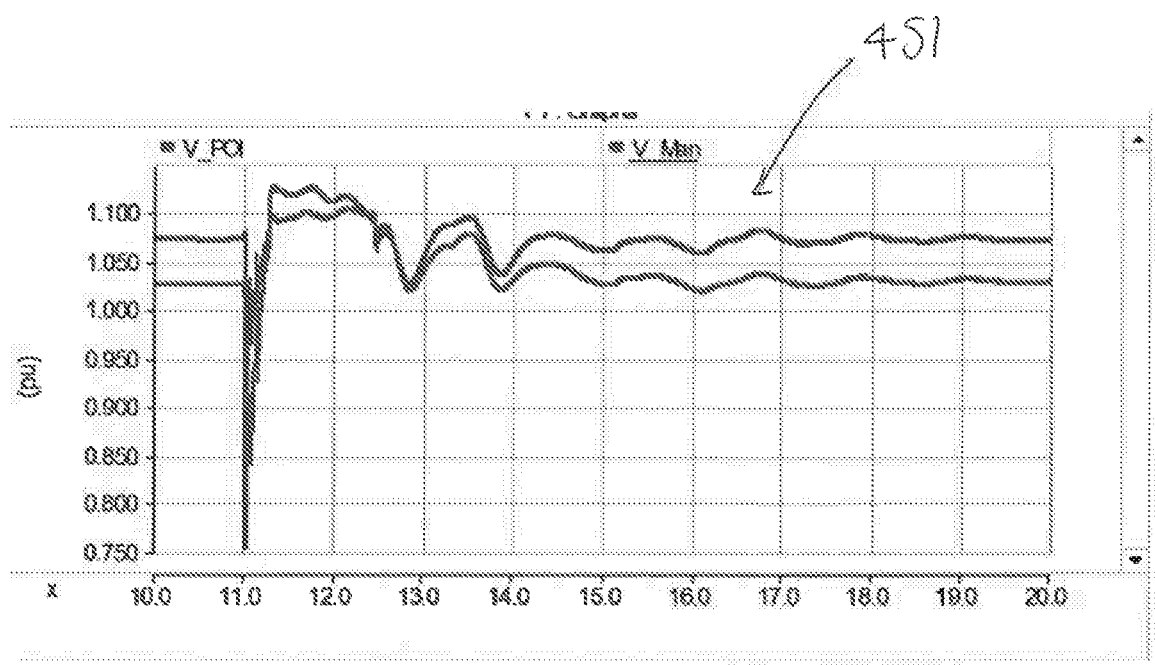

One such response is illustrated in the chart 400 of FIG. 7*a*. The response of active power 401 in the adaptive recovery mode results in the voltage response 451 shown in the chart 450 of FIG. 7*b*, As can be seen, despite a small oscillation in active power between approximately 0 and 1.5 seconds after the fault in FIG. 7*a*, the ramp rate is slow, and results in minimal oscillations of voltage level at the grid due to the weak grid interconnection and active power change.

Trigger Conditions

As discussed in relation to FIGS. 4 and 5, a number of trigger conditions for detecting weak grid interconnections, or for detecting situations in which oscillations may occur due to changes in active power, are presented below. Initially described is activation of the adaptive mode using measurement of a short-circuit ratio associated with the Poi 72, with the activation of the adaptive mode using phase differences between buses 72, 76 of the network 10 following that. Thirdly, activation using changes in voltage is discussed, and fourthly the activation of the adaptive mode in line with an interruption from an external protection system (not shown).

1. Short-Circuit Ratio (SCR)

A SCR for the network 10 can be determined. Typically, the SCR is determined at the medium voltage bus CO. The SCR can be calculated in real-time by measuring the voltage level change for a given reactive power change at the medium voltage bus 60 and the SCR is given as the ratio of this reactive power change to the voltage level change. These values are typically sampled over a short sampling window.

Once the SCR has been determined; it is compared to a pre-set threshold value to identify whether a predetermined trigger condition is fulfilled. If the SCR falls below the threshold, a weak grid interconnection is identified and activates the adaptive active power mode for avoiding oscillations as described above.

In some embodiments, the threshold SCR value for activating the adaptive mode is 3.0. In other embodiments, the threshold value is less than 3.0. For example, the threshold may be a value between 3.0 and 2.5. In exceptional circumstances, the threshold value may be lower than 2.5.

2. Difference in Phase Angle

The PPC 13 may be equipped with a phase measurement unit (not shown) that is configured to compare measured values of particular parameters to establish phase angles at regular intervals. For example, a time interval of between 10 ms and 30 ms may be chosen to measure phase angle parameters of the power network 10 such as: voltage angle; current angle; power angle; frequency; and rate of change of frequency.

The measured phase angle difference corresponds to the amount by which one measured level leads or lags another measured level, measured at a different measurement positions within the network 10.

The phase angle difference can be measured by the PPC 13 at each of a number of buses within the network, or is configured to receive measurements made by power management units (not shown in FIG. 1) associated with the buses.

For example, to determine that a weak grid interconnection exists and that adaptive recovery mode should be activated, the PPC 13 calculates the phase angle difference between the voltage level measured at the Pol bus 72 and the voltage level measured at a bus forming part of the main grid 16, i.e. the substation feeder bus 76 shown in FIG. 1. The PPC 13 compares the phase angle difference to a predetermined threshold or plurality of thresholds to establish whether a weak grid interconnection exists and whether it is likely that voltage oscillations will occur if active power recovery is too fast. The magnitude of the phase angle difference will be greater if there is a higher likelihood of oscillations, Once it has been established that a weak grid interconnection exists and/or that there is a high likelihood of voltage oscillations at the Pol bus 72, the PPC 13 commands operation of the WPP 12 in the adaptive recovery mode.

In a particular example, if a phase angle difference of greater than 50 degrees is identified within a sampling period of 100 ms then the adaptive recovery mode is activated.

3. Voltage Level or Change in Voltage Level

The PPC 13 may be configured to identify changes of voltage over a predefined sampling periods, and to check that they have not deviated above or below predetermined limits.

For example, if the voltage level exceeds 1.1 pu voltage within 100 ms after the fault, or the rate of change of voltage is determined to be above a pre-set level, the adaptive recovery mode may be activated.

4. Interrupt Signal from External Protection System

The PPC 13 may receive an 'interrupt' command signal from an external protection system, and adaptive recovery mode may be implemented based upon receipt of such a signal.

5. Combination of the Above Techniques

In some embodiments, more than one of the above techniques for identification may be combined to determine that adaptive recovery mode is required.

While the majority of the above discussion is related to voltage and active power recovery from decreases in their respective levels, it is also possible that voltage and active power may increase beyond normal operational levels in weak grid interconnected power plants. As such, it is also possible to apply the above methods and conditions to over-voltage situations, and it would be within the skilled person's repertoire to implement such a method successfully.

Many modifications may be made to the above examples without departing from the scope of the present invention as defined in the accompanying claims.

The invention claimed is:

1. A method for operating a renewable energy power plant comprising a plurality of renewable energy generators connected to a grid, the method comprising:
   identifying a predetermined condition of the renewable energy power plant, of the grid, or of the connection between the renewable energy power plant and the grid, the predetermined condition indicating a weak grid interconnection between the renewable energy power plant and the grid; and
   controlling each renewable energy generator in an adaptive active power mode in response to recovery of the grid from a voltage deviation, the adaptive active power mode comprising:
      determining a thermal capacity of a chopper resistor of the renewable energy generator;
      calculating, based upon the determined thermal capacity, a limit level of rate of change of active power output that may be implemented by the renewable energy generator; and
      operating the renewable energy generator to output active power at the calculated rate of change limit level.

2. The method of claim 1, further comprising calculating a short-circuit ratio of the grid, and identifying a predetermined condition at least in part by comparing the short-circuit ratio with a predetermined threshold value.

3. The method of claim 1, further comprising calculating a phase angle difference between two separate measurements of a parameter, and identifying a predetermined condition at least in part by comparing the phase angle difference with a predetermined phase angle difference value.

4. The method of claim 1, further comprising monitoring a voltage level of the renewable power plant, grid, or connection, and identifying a predetermined condition at least in part by comparing the voltage level or the rate of change of voltage against a predetermined threshold.

5. The method of claim 1, wherein identifying a predetermined condition comprises receiving a control signal from an external protection system of the grid.

6. The method of claim 1, further comprising receiving a target active power output level towards which the output of the renewable power plant should be ramped, and wherein the limit level is also calculated based upon the target active power output level.

7. The method of claim 6, wherein the limit level is calculated to be the lowest possible rate of change of active power output by the renewable energy generator to attain the target active power output level without exceeding the thermal capacity of the chopper resistor.

8. The method of claim 6, wherein calculating the limit level further comprises generating an injection profile for active power output of the renewable energy generator, and wherein the method comprises operating the renewable energy generator to output active power according to the generated injection profile.

9. The method of claim 6, further comprising terminating the adaptive active power mode once the output from the renewable power plant is equal to the active power output level.

10. The method of claim 1, wherein the chopper resistor forms part of a chopper circuit, and wherein determining the thermal capacity of the chopper resistor of the renewable energy generator comprises modelling the operation of the chopper circuit and calculating the thermal capacity of the chopper resistor based upon the model.

11. The method of claim 1, wherein determining the thermal capacity of the chopper resistor of the renewable energy generator comprises monitoring at least one parameter of the renewable energy power plant, the grid, the connection between the renewable energy power plant and the grid, or of the renewable energy generator, and calculating the thermal capacity of the chopper resistor based upon the monitored parameter.

12. The method of claim 11, wherein the at least one parameter is the active power output of the renewable energy generator.

13. The method of claim 1, wherein each renewable energy generator comprises at least a first and a second chopper resistor, the first chopper resistor for use during adaptive active power mode and the second chopper resistor for use at other times, and wherein adaptive active power mode is performed with respect to the first chopper resistor only.

14. A controller configured to control a renewable energy power plant according to the method of claim 1.

15. The controller of claim 14, wherein the renewable energy power plant is a wind power plant.

16. A computer program downloadable from a communication network and/or stored on a machine readable medium, comprising program code instructions for implementing a method in accordance with claim 1.

* * * * *